Figure 6:
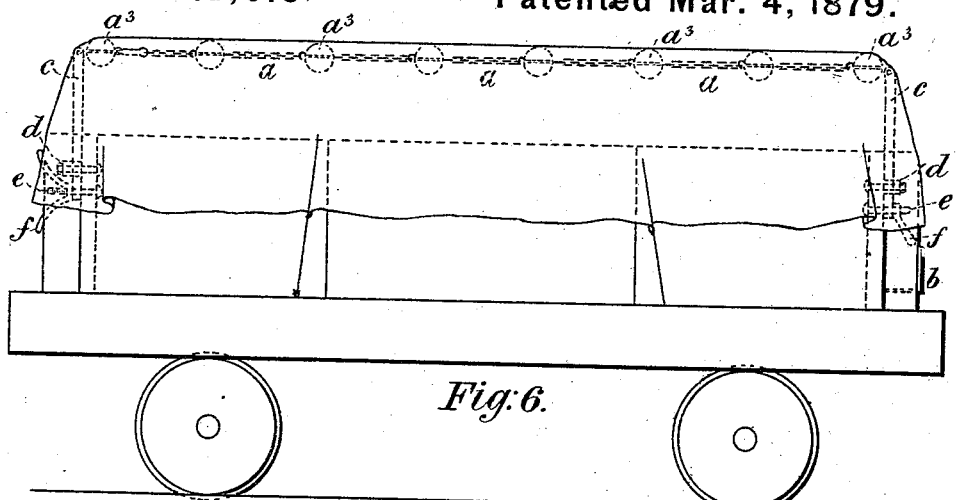

4 Sheets—Sheet 1.
J. G. A. WALKER.
Device for Supporting Truck-Covers.
No. 213,016. Patented Mar. 4, 1879.
Fig:1. Fig:2ª Fig:2ᵇ
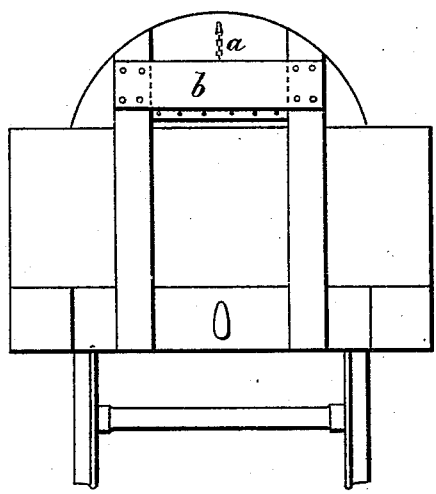
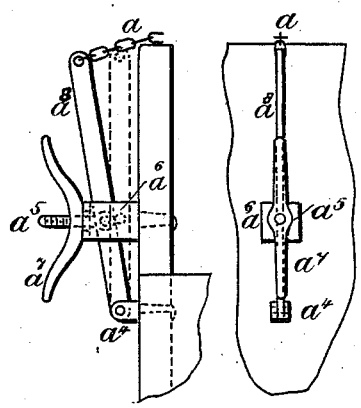
Fig:2ᶜ
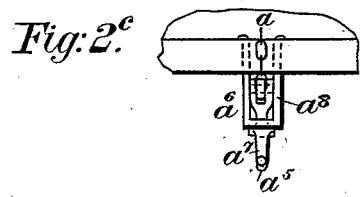
Fig:2.
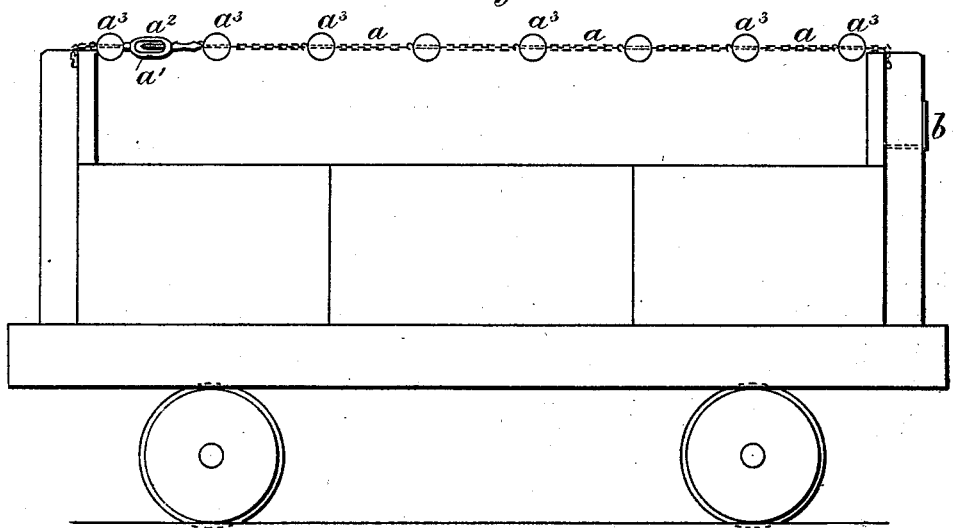
Attest:
Chas. J. Gooch
Geo. T. Smallwood Jr.
Inventor:
John G. A. Walker.
By Knight Bros
Attys.

J. G. A. WALKER.
Device for Supporting Truck-Covers.
No. 213,016. Patented Mar. 4, 1879.
Fig: 5.
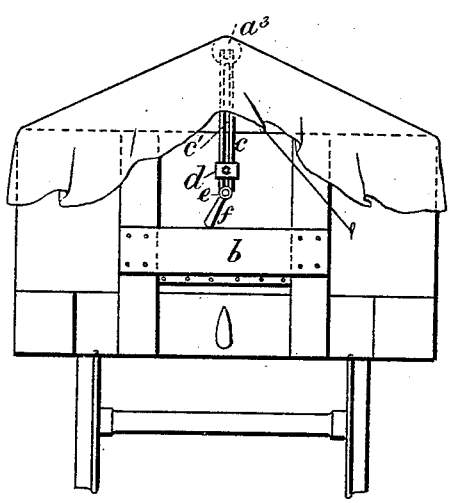
Fig: 3.
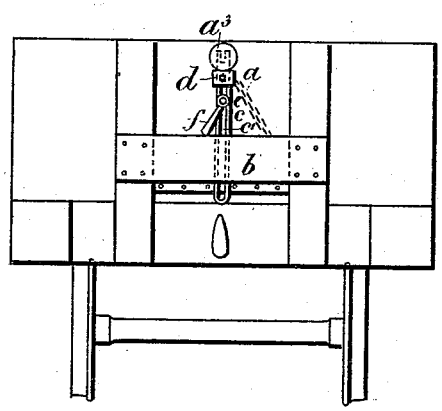
Fig: 4.
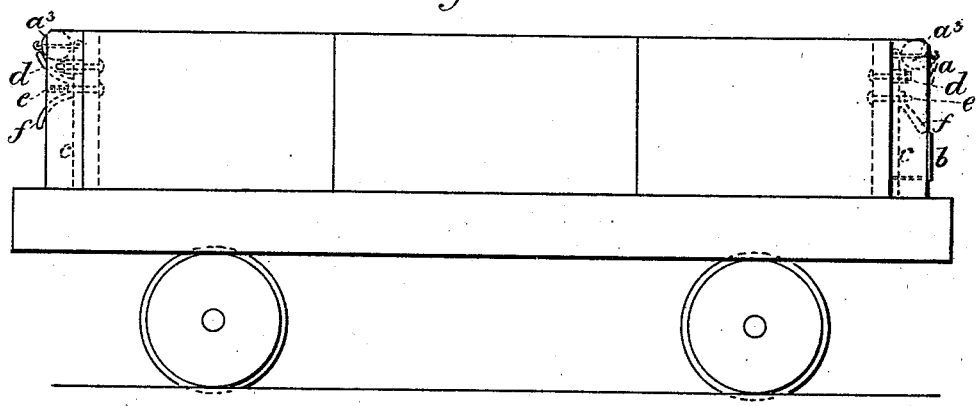
Attest.
Chas. J. Gooch
Geo. P. Smallwood Jr.
Inventor:
John G. A. Walker
By Knight Bro
attys J. G. A. WALKER.
Device for Supporting Truck-Covers.
No. 213,016. Patented Mar. 4, 1879.

4 Sheets—Sheet 4.
J. G. A. WALKER.
Device for Supporting Truck-Covers.
No. 213,016. Patented Mar. 4, 1879.
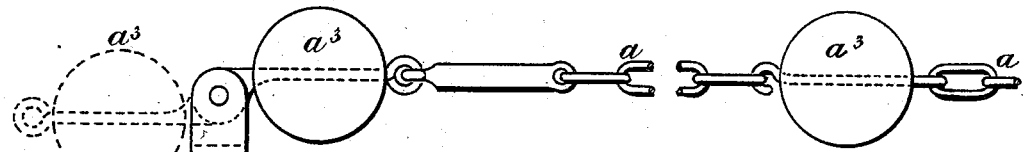
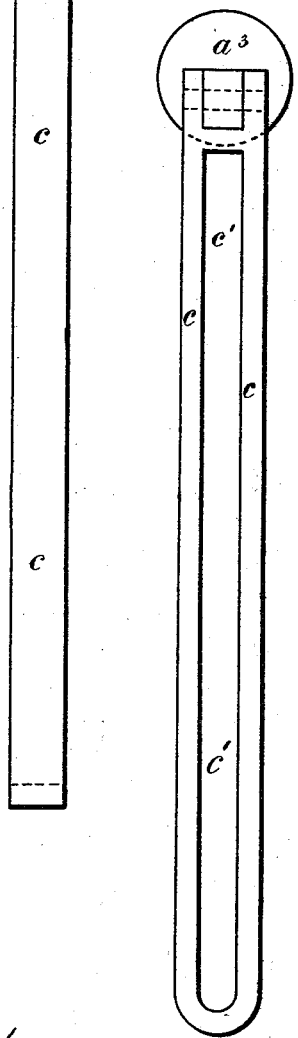
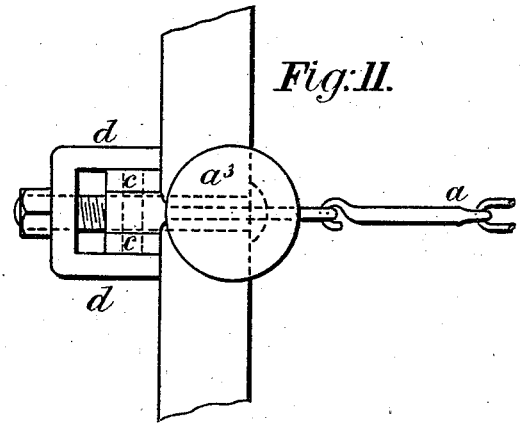

UNITED STATES PATENT OFFICE.

JOHN G. A. WALKER, OF DANES HILL, NEAR RETFORD, ENGLAND.

IMPROVEMENT IN DEVICES FOR SUPPORTING TRUCK-COVERS.

Specification forming part of Letters Patent No. 213,016, dated March 4, 1879; application filed November 21, 1878; patented in England, December 31, 1877.

*To all whom it may concern:*

Be it known that I, JOHN GEORGE AGARS WALKER, of Danes Hill, near Retford, in the county of Nottingham, England, have invented new and useful Improvements in Means or Apparatus Employed in Sheeting Railway-Trucks or Wagons, which improvements are fully set forth in the following specification.

My invention has for its object improvements in means or apparatus employed in sheeting railway-trucks or wagons when the ordinary or loose sheetings are employed; and consists in the employment of a chain or equivalent support for the sheeting, arranged over the center of the truck or wagon, and extending from end to end thereof, so as to afford support to the sheeting, said chain being attached to and stretched longitudinally along the truck between adjustable supports or uprights at the ends of the truck, the supports being adapted to permit of the easy loosening and removal of the chain when desired.

In order that my said invention may be clearly understood and readily carried into effect, I will proceed, aided by the accompanying drawings, fully to describe the same.

In all the figures like parts are marked with similar letters of reference.

Figure 1 is an end elevation, and Fig. 2 is a side elevation, of a high-ended truck or wagon, showing my invention applied thereto.

In this case I fix a portion of a chain, $a$, or its equivalent, to a hook or loop on each end of the truck or wagon, and I connect the two portions of the chain $a$ together by means of a screw-coupling formed of a screw, $a^1$, connected to one part of the chain $a$, and a swivel-nut, $a^2$, connected to the other part, with capability of rotating freely thereon, by which means the chain $a$ can be drawn tight when required.

I provide the chain with a number of rotating balls or other shaped rotating bearing-pieces, $a^3$, mounted at intervals on rods or shafts forming portions of the chain $a$.

When not in use the longer portion of the chain or its equivalent can be disconnected from the shorter part by unscrewing the screw-coupling, and then placed in the box $b$ out of the way, while the shorter portion can be turned over and hang down at the outside of the end of the truck or wagon.

If desired, the screw-coupling $a^1$ $a^2$ may be applied to another part of the chain $a$, in which case a box, $b$, would be required at each end of the truck or wagon.

At Fig. 2 the chain $a$ is shown in position ready for use, and at Fig. 1 it is supposed to be in the box $b$.

At Figs. $2^a$, $2^b$, and $2^c$, I have shown another method of straining the chain, which may be used in lieu of the screw-coupling $a^1$ $a^2$ represented in Fig. 2. In this case the chain $a$ is connected to the upper end of a lever, $a^3$, which is mounted on an axis of motion at $a^4$, and has connected thereto, at or near the center thereof, a screw-bolt, $a^5$, which works through a hole formed in the guide-clip or staple $a^6$. $a^7$ is a fly-nut, working upon the screw-bolt $a^5$. Thus, when the lever $a^3$ is in the position shown by dotted lines at Fig. $2^a$, the chain $a$ can be easily attached thereto; then, by turning the fly-nut $a^7$ in one direction, the chain can be strained as may be required.

Figure 7:
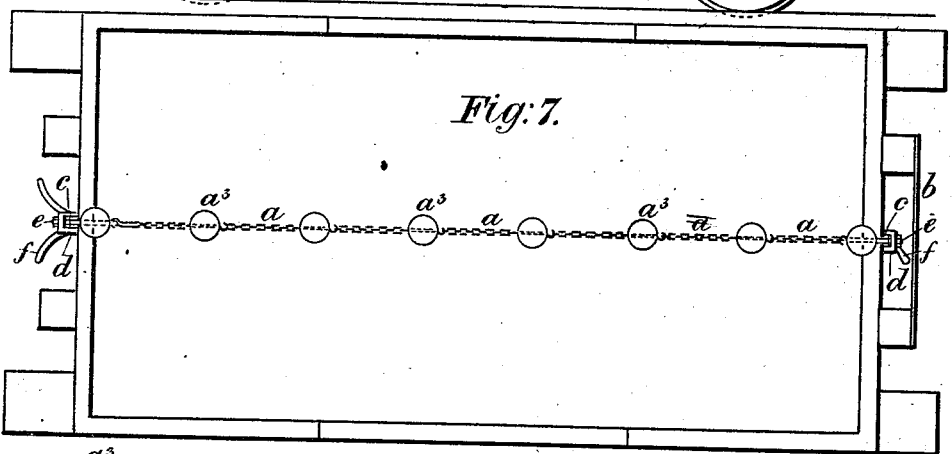
Figure 8:
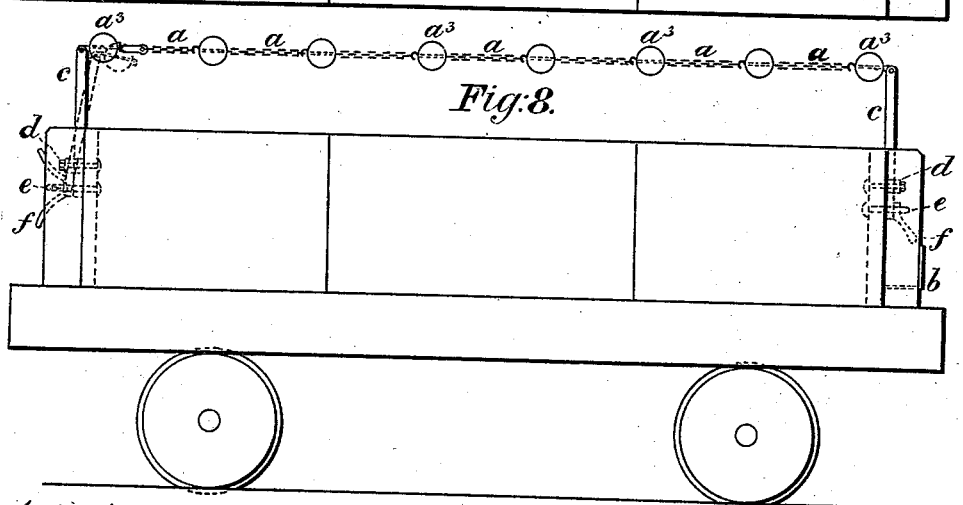

Fig. 3 is an end elevation of a high-sided truck or wagon with my invention applied thereto, and showing the chain $a$ out of use and packed in the box $b$. Fig. 4 is a side elevation of the same. Fig. 5 is an end elevation of a similar truck or wagon, but showing the chain in position supporting the sheeting. Fig. 6 is a side elevation of Fig. 5. Fig. 7 is a plan, and Fig. 8 is a side elevation, of a similar truck or wagon, showing the chain $a$ in position for use, but without the sheeting applied thereto; and Fig. 9 is a side elevation. Fig. 10 is an end elevation, and Fig. 11 is a plan, of parts of my invention drawn to a larger scale.

In the case of trucks or wagons having the sides on a level with the ends, I provide an adjustable support or upright, $c$, at the center of each end of the truck or wagon to carry the chain. These supports $c$, I prefer to arrange as shown in the drawings at Figs. 3 to 11, with capability of being raised and lowered, as may be required, in guides $d$, fixed on the ends of the trucks or wagons. They are also each formed with a longitudinal slot, $c'$, working upon a screw-bolt, $e$, fixed in each end of the truck or wagon, while they are capable of being fixed in their raised position by means of a fly-nut, $f$, working on the bolt $e$.

The chain-support $a$ is formed in a similar manner to that shown and described with respect to Figs. 1 and 2, and the longer part is fixed to one of the supports $c$, and the shorter part thereof is fixed to the other support $c$.

As shown at Figs. 3 to 11, the screw-coupling $a^1$ $a^2$ may be dispensed with, and one part of the chain may be simply hooked onto the other; or the entire chain may be fixed at one end to one support $c$ and hooked at the other end onto the opposite support $c$, in which cases I tilt one of the supports $c$ forward over the truck or wagon, as shown by the dotted lines in Fig. 8, to enable the chain to be hooked thereon or unhooked therefrom, and I strain the chain by screwing the fly-nut $f$ tightly until the support $c$ is brought to a vertical position.

When the chain $a$ is adjusted in position, as shown at Figs. 2, 7, and 8, it is in readiness for the sheeting to be applied thereto, as represented at Figs. 5 and 6, thereby protecting the sheeting from damage, and preventing the lodgment of rain-water thereon.

Having thus described the nature of my said invention, and the mode in which I prefer to carry the same into effect, I would here remark that the mode of raising and lowering the supports $c$ and of fixing them in position, as also the construction of chain or longitudinal support $a$ for the sheeting and mode of straining the same, and the construction of box $b$ to carry the same when out of use, may be modified without departing from the peculiar character of my invention; but

What I claim is—

1. The chain $a$, or its equivalent, having rotating bearing-pieces $a^3$, and the uprights at either end of said truck or wagon, said chain being attached to and supported by said uprights, and being adapted to be strained longitudinally over the center of the truck, to form a support for the coverings of railway-trucks or wagons, substantially as set forth.

2. The adjustable lever or upright for supporting the chain, fly-nut and screw-bolt for operating said lever to tighten or loosen the chain, and a screw-bolt and guide-clip or staple for regulating the vertical movement of the lever or support when desired, substantially as set forth.

3. The combination of the chain $a$, having rotating bearing-pieces $a^3$, for supporting the truck-covering, as explained, the uprights for supporting said chain in a centrally-longitudinal position, and the screw-bolt and fly-nut for exerting pressure on said uprights, and thereby tightening the chain, substantially as set forth.

J. G. A. WALKER.

Witnesses:
B. J. B. MILLS,
C. M. WHITE,
*Both of 23 Southampton Buildings, London, England.*